United States Patent [19]

Bose

[11] Patent Number: 4,707,650

[45] Date of Patent: Nov. 17, 1987

[54] CONTROL SYSTEM FOR SWITCHED RELUCTANCE MOTOR

[75] Inventor: Bimal K. Bose, Latham, N.Y.

[73] Assignee: General Electric Company, Schenectady, N.Y.

[21] Appl. No.: 915,288

[22] Filed: Oct. 3, 1986

[51] Int. Cl.⁴ .............................................. G05B 19/40
[52] U.S. Cl. ..................................... 318/685; 318/696
[58] Field of Search ............... 318/696, 685, 138, 254, 318/561

[56] References Cited

U.S. PATENT DOCUMENTS

| | | | |
|---|---|---|---|
| 4,167,693 | 9/1979 | Liska et al. | 318/138 |
| 4,228,387 | 10/1980 | Brown | 318/696 |
| 4,253,053 | 2/1981 | Ray et al. | 318/701 |
| 4,471,278 | 9/1984 | Matouka | 318/561 |
| 4,500,824 | 2/1985 | Miller | 318/701 |
| 4,520,302 | 5/1985 | Hill et al. | 318/696 |
| 4,611,157 | 9/1986 | Miller et al. | 318/696 |

OTHER PUBLICATIONS

Miyamoko et al., "A Microprocessor-Based Time Optical Control of 2 Variable-Reluctance Step Motor", IEEE Trans. on Instustrial Electronics, IE-29, No. 3, Aug. 1982, pp. 190-196.
R. M. Davis et al., "Inverter Drive for Switched Reluctance Motor: Circuits and Component Ratings", IEE Proc., vol. 128, Pt. B, Mar. 1981, pp. 126-136.
W. F. Ray et al., "Inverter Drive for Doubly Salient Reluctance Motor: Its Fundamental Behaviour, Linear Analysis and Cost Implications, Electric Power Applications, Dec., 1979, vol. 2, pp. 185-193.
B. K. Bose et al., "Start-Up Control for Switched Reluctance Motor", Application Ser. No. 915,291, filed Oct. 3, 1986.
B. K. Bose et al., "Microcomputer Control of Switched Reluctance Motor", presented at IEEE/IAS Annual Meeting, Toronto, Canada, Oct. 7, 1985.
AMD Handbook, "Am 9513 System Timing Controller", 1983, published by Advanced Micro Devices Co., pp. 4-47-4-72.

Primary Examiner—William M. Shoop, Jr.
Assistant Examiner—Saul M. Bergmann
Attorney, Agent, or Firm—Marvin Snyder; James C. Davis, Jr.

[57] ABSTRACT

A programmable, closed-loop four quadrant control system for a switched reluctance motor employs feedback control, angle control and current control. The feedback control can be implemented with a speed feedback loop and/or a torque feedback loop. The angle control digitally synchronizes stator phase current pulses with rotor position, and the current control acts as a chopping or bang-bang controller to limit magnitude of the stator phase current pulses.

48 Claims, 24 Drawing Figures

Fig. 2b FORWARD MOTORING (FM)

Fig. 2c FORWARD BRAKING (FG)

Fig. 2d REVERSE MOTORING (RM)

Fig. 2e REVERSE BRAKING (RG)

CONTROL SYSTEM FOR SWITCHED RELUCTANCE MOTOR

BACKGROUND OF THE INVENTION

This invention relates generally to motor controls and more specifically to a control system for a switched reluctance motor.

This application is related to B. K. Bose et al. application Ser. No. 915,291, filed Oct. 3, 1986 and assigned to the instant assignee.

Although they have been known for some time, interest in switched reluctance motor (SRM) drives has recently revived. Compared to conventional induction and synchronous motor drive systems, the SRM drive is simple in construction and economical. In addition, the converter which supplies power to the SRM machine requires fewer power devices and, therefore, is more economical and reliable. In view of these advantages, the switched reluctance motor drive system provides an attractive alternative to conventional drive systems and is expected to find wide popularity in industrial applications.

Switched reluctance motors conventionally have multiple poles or teeth on both the stator and rotor (i.e. doubly salient). These are phase windings on the stator but no windings on the rotor. Each pair of diametrically opposite stator poles is connected in series to form one phase of the multiphase switched reluctance motor.

Torque is produced by switching current on in each phase winding in a predetermined sequence that is synchronized with the angular position of the rotor, so that a magnetic force of attraction results between the rotor and stator poles that are approaching each other. The current is switched off in each phase before the rotor poles nearest the stator poles of that phase rotate past the aligned position; otherwise, the magnetic force of attraction would produce a negative or braking torque. The torque developed is independent of the direction of current flow so that unidirectional current pulses synchronized with rotor movement can be applied by a converter using unidirectional current switching elements such as thyristors or transistors.

In operation, each time a phase of the switched reluctance motor is switched on by closing a switch in a converter, current flows in the stator winding of that phase, providing energy from a DC supply to the motor. The energy drawn from the supply is converted partly into mechanical energy by causing the rotor to rotate toward a minimum reluctance configuration and partly into stored energy associated with the magnetic field. After the switch is opened, part of the stored magnetic energy is converted to mechanical output and part of the energy is returned to the DC source.

Most of the published literature relating to SRM drives concentrates on analysis of the machine and the configuration of the power converters; very few papers discuss the control aspects. The control requirements of the SRM drive are so unique that the concepts of induction and synchronous-type machines can hardly be extrapolated to the SRM. The SRM drives discussed in the literature are mainly open-loop control with angle and current amplitude regulation by manual adjustment, and have usually been designed with discrete components and dedicated hardware. Such prior control systems are frequently bulky, complex, expensive, limited in mode of operation, and hardware intensive. Although suitable for laboratory tests, an SRM with such a control system does not readily lend itself to industrial applications.

A need thus exists for a control system for a switched reluctance motor which overcomes the drawbacks of presentday designs and facilitates use of the switched reluctance motor for general purpose industrial applications.

SUMMARY OF THE INVENTION

Briefly, this need is satisfied, in accordance with the present invention, by a programmable, closed-loop four-quadrant control system incorporating feedback control, angle control, and current control. In a preferred embodiment, the feedback control incorporates a speed feedback loop and/or a torque feedback loop, the angle control digitally synchronizes stator phase current pulses with rotor position, and the current control acts as a chopping or bang-bang controller to limit magnitude of the stator phase current pulses. With the control system of this invention, the magnitude and turn-on and turn-off angles of stator current pulses for each phase, in feedback mode, are controlled so as to provide smooth operation and full torque and speed range with optimum performance in all four quadrants of SRM operation (i.e. forward motoring, forward bracking, reverse motoring and reverse braking). The closed-loop control system is preferably microcomputer-based, affording simplicity, flexibility, accuracy and extreme hardware simplification.

In accordance with one aspect of the present invention, the feedback control closed-loop processes an actual motor speed signal and an operator command to generate a current command, which serves to limit magnitude of actual phase current, and also generates a turn-on angle signal and a pulsewidth angle signal which are coordinated with a particular quadrant in which the motor is operating. The values of turn-on angle and pulsewidth angle are preferably independently programmable for different quadrants of operation. For motoring quadrants, the turn-on angle signal is directly proportional to the current command while the pulsewidth angle signal is a function of the current command and actual motor speed. The feedback control can be a speed feedback loop, a torque feedback loop or a speed feedback loop with an inner torque loop.

In accordance with another aspect of the invention, the digital angle control processes rotor position information signals to generate a multiphase sync pulsetrain and individual stator phase sync signals for the respective stator phases. The angle control also generates a resolution signal, i.e. a pulsetrain with the desired angle resolution. The resolution signal is a phase-locked, frequency-multiplied derivative of the multiphase sync pulsetrain. The angle control employs the resolution signal and the individual stator phase sync signals to convert a turn-on angle signal and a pulsewidth angle signal into corresponding current pulses synchronized with rotor position for each of the stator phases. Preferably the digital angle control is implemented with a microcomputer together with a set of independently programmable delay and pulsewidth counters for each stator phase.

In accordance with a further aspect of the present invention, the current control compares the current command from the feedback control with actual current in each stator phase to generate a current magnitude limiting signal, and couples this signal with the pulsetrain for each phase from the angle control to generate the stator current control pulses applied to the switching elements in the SRM power converter. Preferably the current control operates in accordance with the principle of a bang-bang current control and serves to maintain amplitude of the actual current in each stator phase within a hysteresis band of the current command up to a base motor speed, and limits peak amplitude of the actual current in each stator phase to the maximum value of the hysteresis band beyond the base speed.

Accordingly, it is a principal object of the present invention to provide a new and improved method and apparatus for controlling a switched reluctance motor which overcomes the drawbacks of prior control systems and facilitates industrial application.

Another object of the present invention is to provide an SRM control system which is programmable, self-regulating and four-quadrant compatible.

A further object of the present invention is to provide an SRM control system which is simple and inexpensive yet flexible and highly accurate Yet another object of the present invention is to provide a control system which optimizes SRM performance in, and transition between, start-up, constant torque and constant power modes.

A still further object is to provide an SRM control system which can be readily implemented using a microcopmuter and state-of-the-art digital hardware, is compatible with converters of different configurations associated with SRMs, and is sophisticated and efficient in operation while being relatively simple in construction.

A still further object of the present invention is to provide a control system which improves operational characteristics of switched reluctance motors and extends their applicability.

BRIEF DESCRIPTION OF THE DRAWINGS

The foregoing and other objects, features and advantages of the present invention will be apparent from the following detailed description of the invention when read in conjunction with the accompanying drawings in which:

FIG. 1b illustrates a typical power converter for the switched reluctance motor of FIG. 1a;

FIG. 2a profiles inductance with respect to rotor angular position for a stator pole pair of the motor of FIG. 1a;

FIGS. 2b, 2c, 2d and 2e illustrate typical stator phase current pulses for forward motoring, forward braking, reverse motoring and reverse braking, respectively, and are helpful in understanding the relationship of these pulses to the inductance profile of FIG. 2a;

DETAILED DESCRIPTION OF THE INVENTION

The control system of the present invention will now be described in connection with a four-phase switched reluctance motor 10, illustrated in FIG. 1a, and the associated power converter 20, shown in FIG. 1b. It should be understood that this motor/converter configuration is merely representative, and that the control system of the present invention is applicable to any SRM.

Figure 1A:
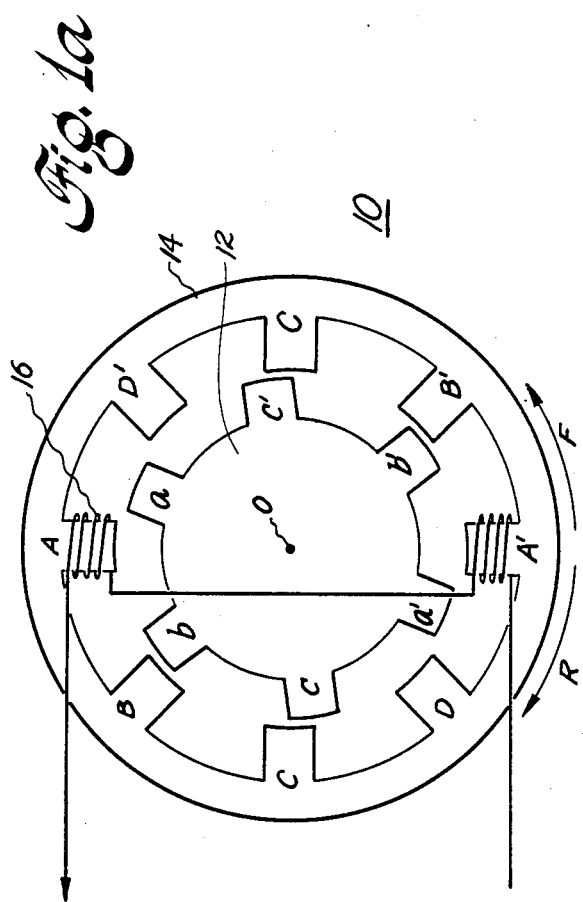
FIG. 1a is a cross-sectional view of a typical switched reluctance motor.
Figure 1B:
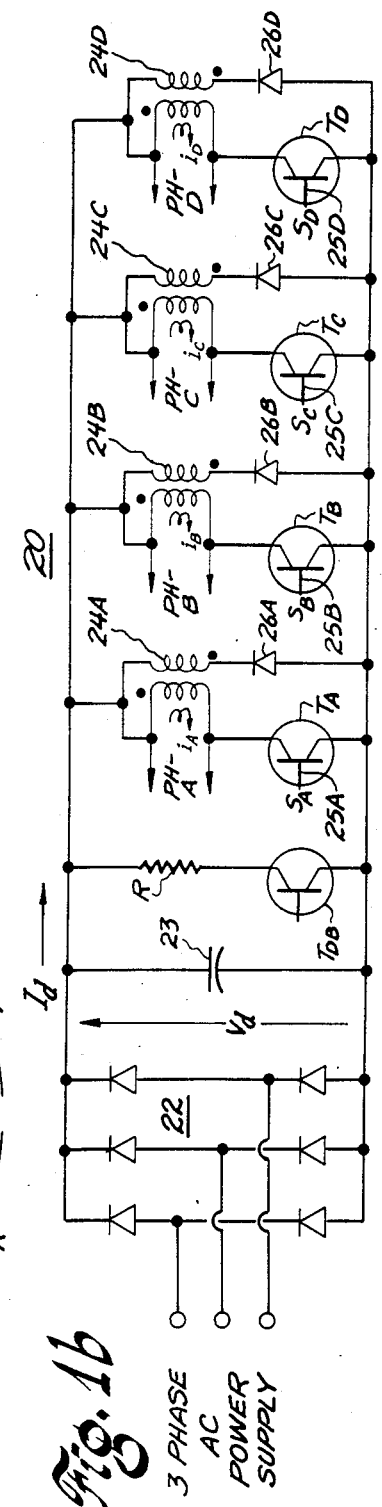

As shown in FIG. 1a, motor 10 includes a rotor 12 rotatable in either a forward or reverse direction within a stationary stator 14. As illustrated, the forward direction F indicates counterclockwise rotation of the rotor while the reverse direction R indicates clockwise rotation. Rotor 12 has three pairs of diametrically opposite poles a—a', b—b' and c—c'. Stator 14 is provided with four pairs of diamterically opposite stator poles A—A', B—B', C—C' and D—D'. In the illustrated embodiment, each rotor pole and each stator pole has an angular extent of 18 degrees. The gap between adjacent rotor poles in the illustrated embodiment is 42 degrees while the gap between adjacent stator poles is 27 degrees. These angles are measured about a central axis of rotation passing through point O.

The opposite poles of each stator pole pair share a common bifilar winding and define a respective stator phase. A representative winding coil 16 for phase A is illustrated in FIG. 1a. Similar windings are provided for each of the other stator pole pairs.

Rotor rotation is produced by switching current on and off in each stator phase winding in a predetermined sequence synchronized with angular position of the rotor. Current in each stator phase is derived from power convertor 20 of FIG. 1b, which impresses a DC link voltage $V_d$ across the four parallel stator phase legs PH-A, PH-B, PH-C and PH-D. Link voltage $V_d$ can be obtained from a battery (not shown), or from an AC power supply (e.g. a three-phase, 220 volt, 60 Hz line) through a conventional diode rectifier circuit 22 and filtering capacitor 23.

The converter circuitry for each stator phase leg is identical. The PH-A leg, for example, includes stator bifilar winding 24A, a feedback diode 26A and a current switching device e.g. transistor $T_A$, interconnected as shown in FIG. 1b. As will be more fully explained hereinafter, base 25A of transistor $T_A$ is connected to an output of the control system of the present invention and receives a switching control pulsetrain $S_A$ therefrom.

When transistor $T_A$ is switched on, a phase current $i_A$, derived from link current $I_d$, flows through the stator winding for phase A. When transistor $T_A$ is switched off, bifilar winding 24A in series with feedback diode 26A returns stored energy to the source. During braking, dynamic brake transistor $T_{DB}$ in series with a resistor R across the rectified AC source is switched on the dissipate recovered energy in resistor R. Alternatively, with a battery power supply, the energy is absorbed by the power supply.

The converter circuitry for each of the other phase legs operates identically and accordingly is not detailed herein. Transistors $T_A$, $T_B$, $T_C$ and $T_D$ are made to conduct in sequence, with the order of conduction depending upon the direction of rotation. In the embodiment illustrated, a particular phase is fired periodically with a 60 degree cycle period and, therefore, for the four-phase machine, consecutive phases are fired at 15 degree intervals.

The timing and waveshape of stator phase current pulses for different quadrants of operation will now be explained and it will be seen that the present invention serves to optimize unidirectional torque for each quadrant.

Figure 2A:
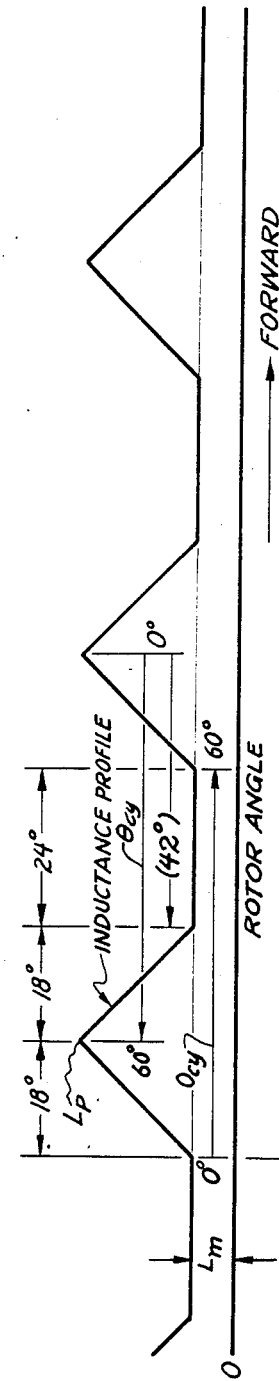
Figure 2A:
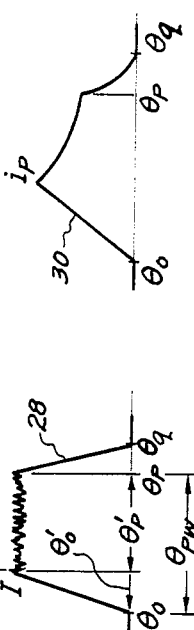
Figure 2A:
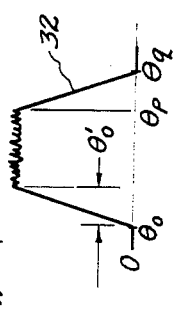
Figure 2A:
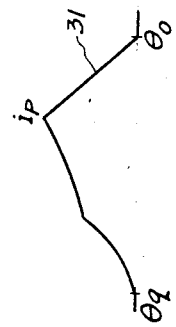
Figure 2A:
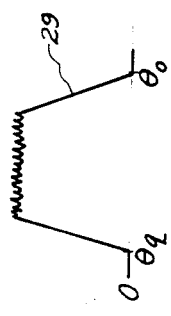

The inductance profile of a stator pole pair (e.g. phase A) with respect to rotor angular position is shown in FIG. 2a, while typical stator phase current pulses for the various quadrants are illustrated in FIGS. 2b, 2c, 2d and 2e. The inductance profile has a cycle period $\theta_{cy}=60°$ and the distribution of rising inductance, falling inductance and minimum inductance periods, for both forward and reverse direction rotations and reference frames, is shown in FIG. 2a. For forward rotation, the inductance increases for the first 18 degrees. At 18° a rotor pole is aligned with the stator pole and peak inductance $L_p$ is achieved. From 18° to 36°, the inductance falls and for the next 24 degrees remains at a minimum inductance $L_m$, then the cycle repeats. For reverse rotation, the inductance falls from 0° to 18°, remains at a minimum inductance $L_m$ from 18° to 42°, and then rises to the peak inductance $L_p$ from 42° to 60°.

Referring now to both FIGS. 2a and 2b, it will be seen that in a forward motoring (FM) quadrant the stator current pulse 28 is established where the inductance profile has a positive slope. This is because the instantaneous motor torque $T_e$ is given by the relation $$T_e = \tfrac{1}{2} i^2 m \tag{1}$$

where i is instantaneous current and m is the inductance slope.

Current i is switched on at an advance angle $\theta_o'$ and rises linearly to the magnitude I at the corner point (0°) of the inductance profile according to the relation $$\theta_o' = I^*(L_m \omega_r / V_d) \tag{2}$$

where $L_m$ is the minimum inductance, $\Omega_r$ is the rotor speed, and $V_d$ is the DC link voltage. Current I is maintained substantially constant by a chopping or bang-bang control, described more fully hereinafter, and is controlled such that $I=I^*$. The transistor is switched off at a turn-off angle $\theta_p$, which is a few degrees ahead of the peak inductance $L_p$ point, so that the angle $\theta_q$, at which the current reaches zero, occurs only slightly into the negative inductance slope region. A pulsewidth angle $\theta_{pw}$ extending from the transistor turn-on angle $\theta_o$ (also sometimes referred to as the delay angle) to the transistor turn-off angle $\theta_p$ is shown in FIG. 2b, along with the angle $\theta_p'$ which extends from the positive inductance slope corner point to the transistor turn-off angle $\theta_p$.

As actual speed $\omega_r$ increases, angles $\theta_o$ and $\theta_q$ expand or spread apart from each other, but angle $\theta_p$ remains unchanged, as shown by pulse 30 in FIG. 2b. At high speed, the machine counter-EMF dominates and bang-bang current control is lost. In this state, the current controller, described in detail hereinafter, acts as a limiter of peak current $i_p$. The position of peak current may deviate due to saturation effects. In accordance with the present invention, expansion of angles $\theta_o$ and $\theta_q$ is effectively limited to optimize torque production.

As shown in FIG. 2c, current pulse 32, during forward braking (sometimes referred to as forward generation, i.e., FG), is nearly identical to current pulse 28 (FIG. 2b) during forward motoring at low speed, except that pulse 32 is established where the inductance slope is negative. Since, in this quadrant, angle $\theta_q$ can freely occur in the minimum inductance region, angle $\theta_p$ is kept constant at 36 degrees. The advance angle $\theta_o'$ is limited because any current in the positive slope region of the inductance profile contributes counter-productive motoring torque. Only one waveform for forward braking is shown in FIG. 2c since the bang-bang current control remains valid in the entire speed region.

As shown in FIG. 2d, current pulse waveshapes 29, at low speed, and 31, at high speed, in reverse motoring (RM) are identical to those in forward motoring, except that they are reversed in direction and occur during a negative slope of the inductance profile, which appears as a positive slope in the reverse direction. Current pulse 33 for reverse braking (or reverse generation, RG), shown in FIG. 2e, is identical to forward braking pulse 32 of FIG. 2c, except that it is reversed in direction and occurs during the positive slope (which appears as a negative slope in reverse rotation). As with forward braking, bang-bang current control remains valid at all speeds during reverse braking.

The basic control parameters of the SRM drive system can be summarized as follows:

I—chopping current level, which is also the peak-limiting current $i_p$ in the constant power region;

$\theta_o$—transistor turn-on angle, which is related to the advance angle $\theta_o'$; and $\theta_p$—transistor turn-off angle, which is related to the pulsewidth angle $\theta_{pw}$.

Figure 3:
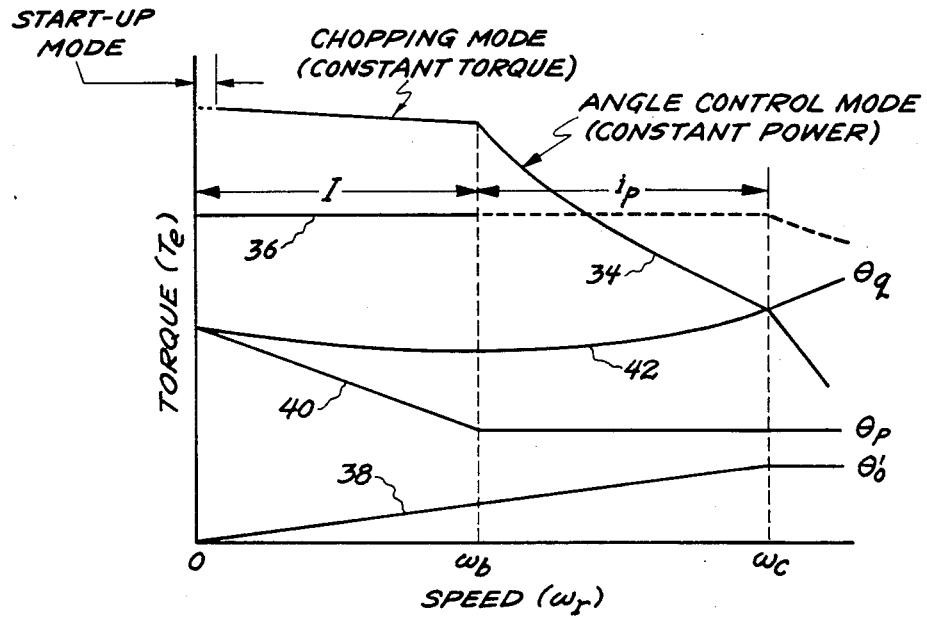
FIG. 3 shows a typical torque-speed curve of a switched reluctance motor in motoring mode and also illustrates the current and angle profiles.

In accordance with the present invention, the above parameters are programmably closed-loop controlled to optimize SRM performance in all four operating quadrants and different speed regions. FIG. 3 shows the typical torquespeed curve 34 of the SRM in forward motoring quadrant, and also indicates the current magnitude profile 36, the advance angle $\theta_o'$ profile 38, the turn-off angle $\theta_p$ profile 40, and the zero current angle $\theta_q$ profile 42, with respect to speed. At speeds typically below a few revolutions per minute, defined as the start-up mode, full torque is available. The chopping mode, which extends up to a base speed of $\omega_b$, essentially defines the constant torque region where amplitude of current I is controlled by the bang-bang principle and $\theta_o'$ and $\theta_p$ are determined by the feedback control of the present invention. Beyond the chopping mode, curve 34 enters the constant power region where the torque is controlled only by advance angle $\theta_o'$. Then, above the critical speed $\omega_c$, the limit of angle $\theta_o'$ is reached and the torque falls off with a steeper slope. As explained more fully hereinafter, in the constant power region, current chopping may be resumed if the peak current rises above a threshold value.

Having described to this point the basic characteristics and underlying operating and control principles of a switched reluctance motor and associated power converter to be outfitted with the control system of the present invention, the details of construction and operation of embodiments of the invention will now be presented.

Figure 4:
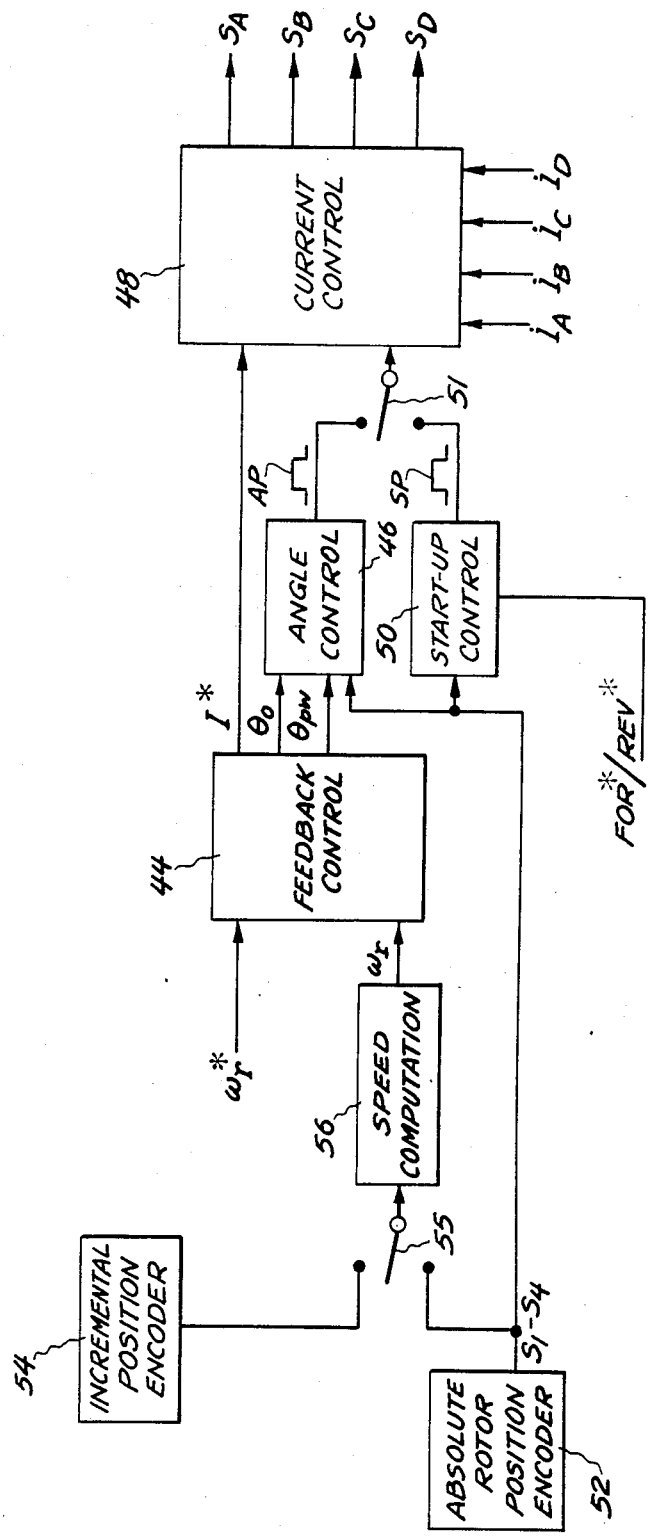
FIG. 4 is a simplified functional block diagram of the SRM control system in accordance with the present invention.

The control system of the present invention is depicted in simplified functional block diagram form in FIG. 4. The basic system includes feedback control 44, angle control 46, and current control 48. In addition, a start-up control 50, an absolute rotor position encoder 52, and incremental position encoder 54 and a speed calculator 56 are advantageously employed.

Feedback control 44 may comprise a speed loop, a torque loop or a speed with inner torque feedback loop. As an example, FIG. 4 illustrates use of a speed loop. The feedback control receives an operator command, e.g. speed command $\omega_r^*$ $_e^*$, and an actual speed signal $\omega_r$ from speef calculator 56. The closed loop feedback control processes the operator command and actual speed signal to generate a current command I*, a turn-on angle signal $\theta_o$ and a pulsewidth angle signal $\theta_{pw}$. The values of the turn-on angle and pulsewidth angle signals are preferably independently programmable for different quadrants of operation. In a particular embodiment, for motoring quadrants, the turn-on angle signal is made directly proportional to the current command, and the pulsewidth angle signal is made a function of the current command and actual motor speed. Preferred implementations of feedback control 44 are described hereinafter, in detail, in conjucntion with FIGS. 8–10.

Angle control 46 receives the turn-on angle signal and the pulsewidth angle signal from feedback control 44, and rotor position information signals $S_1$, $S_2$, $S_3$ and $S_4$ from encoder 52. The angle control digitally processes these signals to provide mutually phase-shifted pulsetrains AP for the different stator phases, each pulsetrain comprising conduction angle pulses synchronized with the rotor position and coordinated with an inductance profile of the motor in accordance with a selected quadrant of motor operation. As described more fully hereinafter in connection with FIGS. 11–16, the angle control is preferably implemented with a phase-locked loop and pairs of independently programmable delay and pulsewidth counters.

Current control 48 receives the current command I* from feedback control 44, the actual current $i_A$, $i_B$, $i_C$ and $i_D$ for each stator phase, and the pulsetrains AP from angle control 46. The current control processes these signals to provide switching control signals $S_A$, $S_B$, $S_C$ and $S_D$ to the bases of transistors $T_A$, $T_B$, $T_C$ and $T_D$, respectively, shown in FIG. 1b. The current control preferably operates on a bang-bang control principle and serves to maintain amplitude of actual current in each stator phase within the hysteresis band of the current command, up to a base motor speed, and limits peak amplitude of actual current in each stator phase to the maximum value of the hysteresis band beyond the base speed. A particular implementation of the current control is described hereinafter in conjunction with FIG. 17.

The control system of the present invention may be provided with a start-up control 50 for initiating rotor rotation. The start-up control receives rotor position encoder signals $S_1$–$S_4$ and a direction command FOR*-/REV*, and generates start-up stator current pulses SP. The start-up pulses are provided to current control 48 during a start-up mode. Upon transition to a feedback control mode, a switch 51 terminates the supply of pulses SP to current control 48 from start-up control 50, and instead supplies pulses AP to current control 48 from angle control 46. Switch 51 is typically implemented in microprocessor software in a manner well known to those skilled in the art. Although conventional start-up techniques can be employed with the control system of the present invention, the start-up control described in commonly assigned, co-pending U.S. application, Ser. No. 915,291 entitled "Start-Up Control For Switched Reluctance Motor" by B. K. Bose and P. M. Szczesny, filed concurrently herewith, is preferably utilized.

Absolute rotor position encoder 52 provides position information signals $S_1$–$S_4$, indicative of instantaneous rotor position, for pulse synchronization purposes, to angle control 46 and start-up control 50. The same rotor position information signals can advantageously be processed by speed calculator 56 to generate the actual speed signal $\omega_r$. Although encoder 52 may take one of several different forms, it is preferably an optical encoder such as that described hereinafter with respect to FIGS. 6 and 7. Similarly, the computation of actual speed can be implemented in various ways; a preferred embodiment is described subsequently in conjunction with FIG. 13. At low speeds, it may be desirable to employ an incremental position encoder 54 providing a high number of pulses at low speed, such as a Teledyne sensor model number 8625-600-042-10 available from the Teledyne Company, instead of absolute encoder 52. A switch 55 facilitates selection of the desired encoder.

Figure 5:
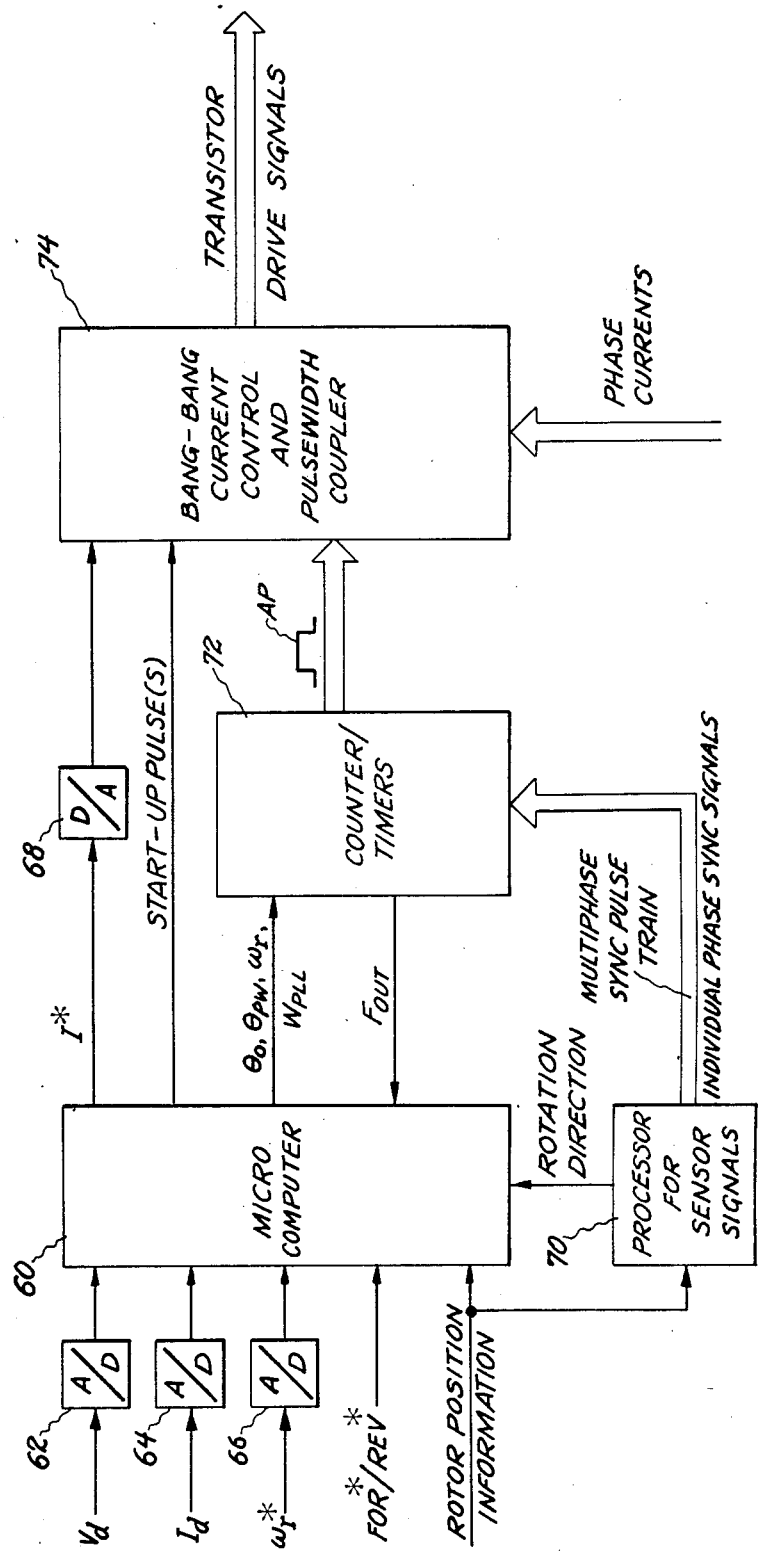
FIG. 5 is a simplified block diagram illustrating a preferred implementation of the control system of the present invention.

In operation, the overall control system of the present invention receives speed and direction commands from an operator and produces switching control signals for each stator phase, which signals are synchronized with rotor position, optimized for the particular quadrant of operation and continuously regulated in closed loop. FIG. 5 is a simplified block diagram showing the hardware implementation of a preferred embodiment of the control system of the present invention. A microcomputer 60 such as an Intel 8751 single chip microcomputer, is preferably employed to compute feedback speed and/or torque, turn-on angle and pulsewidth angle, and to implement the feedback speed and/or torque loops, the start-up control, sequencing control, and a phase-locked loop for the angle control. Peripheral hardware for the microcomputer includes analogto-digital converters 62, 64 and 66 for acquisition of DC link voltage $V_d$, the link current $I_d$ and speed command $\omega_r^*$, respectively, and a digital-to-analog converter 68 for receiving current command I* from microcomputer 60. Microcomputer 60 also receives a direction command FOR*/REV* in open loop, rotor position information signals from a position encoder (not shown), rotation direction signals and clock signals $F_{out}$.

Figure 12:
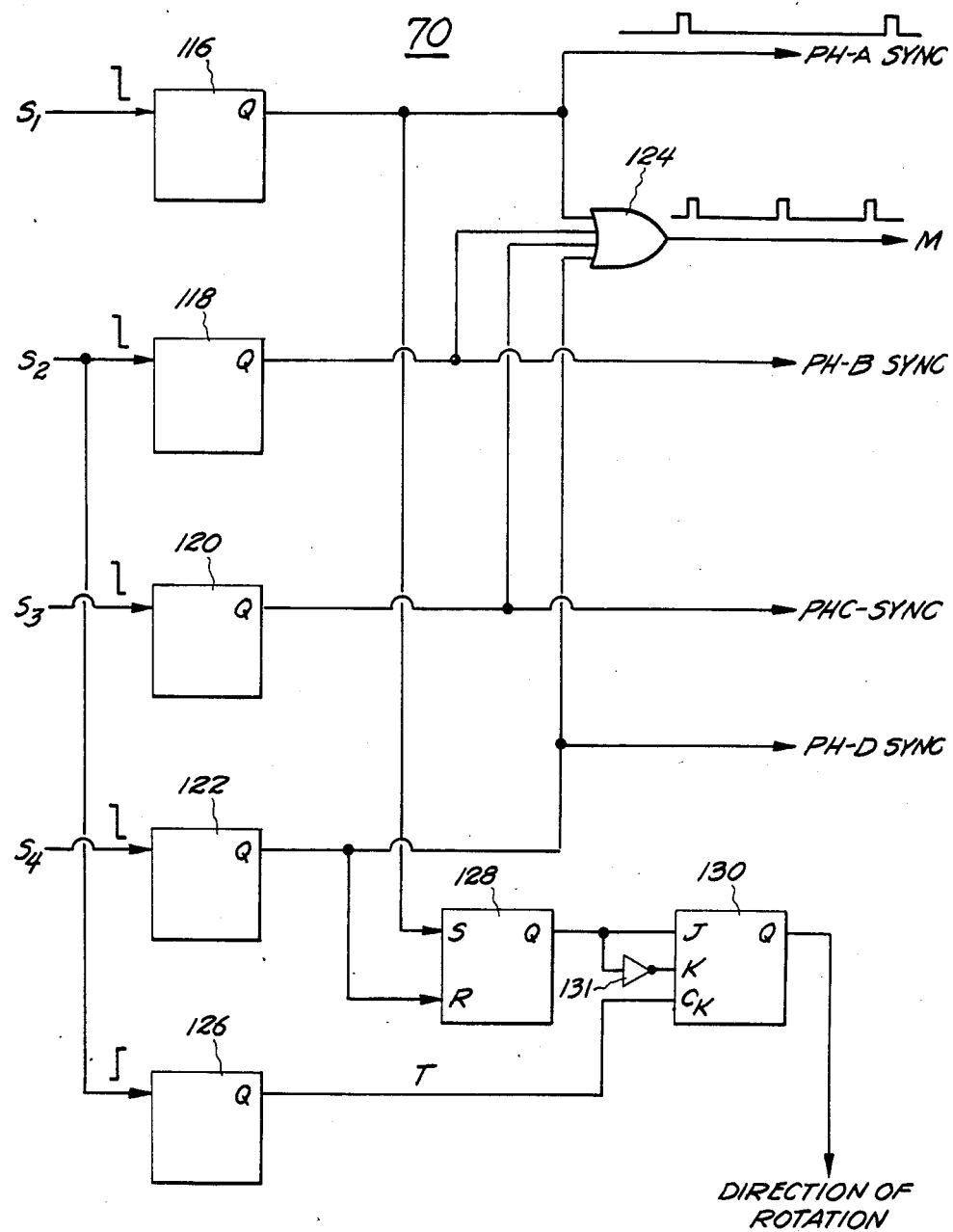
FIG. 12 illustrates, in block diagram form, an embodiment of a processor for encoder signals useful in the angle control.

The latter two signals are generated by dedicated hardware which is part of the angle control. This hardware includes a signal processor 70 which generates, from the rotor position information signals, a multiphase sync pulsetrain and individual phase sync signals, as well as the rotation direction signals. A preferred embodiment of this processor is shown in FIG. 12 and described hereinafter.

The angle control also includes counter/timers 72 which receive the multiphase sync pulsetrain and individual phase sync signals from processor 70, as well as the turn-on angle $\theta_o$ and pulsewidth angle $\theta_{pw}$ signals, an actual speed signal $\omega_r$, and a digital word $W_{PLL}$ from microcomputer 60. Counter/timers 72 provide the clock signal $F_{out}$ to microcomputer 60 and the angle pulsetrains AP to the current control. As explained more fully hereinafter in conjunction with FIG. 16, counter/timers 72 are preferably implemented by two system timing controller chips e.g., type AM9513 manufactured by Advanced Micro Devices.

Finally, a separate hardware subsystem is preferably employed as a bang-bang current controller and pulsewidth coupler 74. This current controller receives the start-up pulses from microcomputer 60 or the angle pulses AP from counter/timers 72, the current command I* from digital-to-analog converter 68 and the actual phase currents. The output signals of current controller 74 constitute the base drive signals provided to the switching transistors of the power converter. A particular embodiment of a multichannel current control employing Schmitt triggers will be described hereinafter in connection with FIG. 17.

It will be appreciated by those skilled in this art that the present invention may be implemented using other hardware and partitioning schemes.

Figure 6:
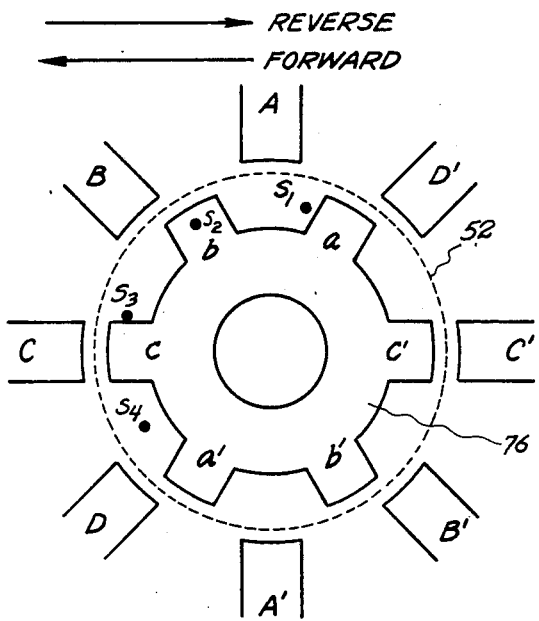
FIG. 6 is a simplified end view of an SRM showing a rotor position encoder useful in the present invention.

As mentioned earlier, the SRM is provided with an absolute rotor position encoder. As shown in the end view of FIG. 6, encoder 52 preferably comprises four optical sensors $s_1$, $s_2$, $s_3$ and $s_4$ and an interrupting type disk 76. Disk 76 has the same exterior profile as the rotor, and is aligned and mounted to rotate therewith. The sensors are mounted at the farthest clockwise edge of each respective stator pole pair, i.e. sensor $s_1$ at the farthest clockwise edge of stator pole A, $s_2$ at the farthest clockwise edge of pole B, $s_3$ at the farthest clockwise edge of pole C and sensor $s_4$ at the farthest clockwise edge of pole D, as shown in FIG. 6.

Figure 7:
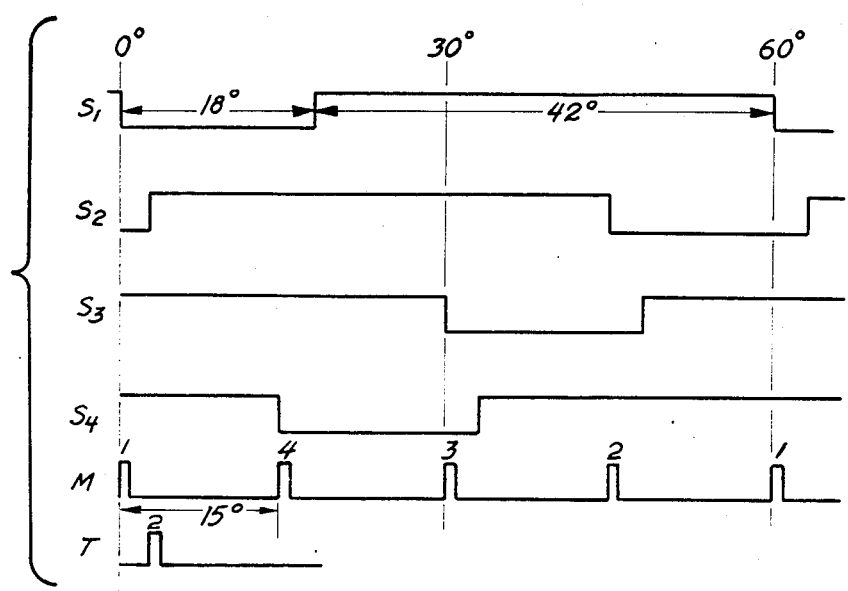
FIG. 7 illustrates logic signal waveforms derived from a rotor position encoder for forward rotation.

FIG. 7 shows the logic output waveforms from the optical sensors for forward rotation. Signals M and T are discussed subsequently, beginning in conjunction with FIG. 12. Signals $S_1$, $S_2$, $S_3$ and $S_4$ represent the outputs of sensors $s_1$, $s'hd 2$, $s_3$ and $s_4$, respectively. Each signal has a logic 0 value when optical energy impinging on the sensor generating the respective signal is interrupted by disk 76 and a logic 1 value when such optical energy is uninterrupted. As shown, the signals are mutually phase-shifted by 15 degrees. The sensor output signals are used for SRM starting and generation of position synchronized switching current pulses in running condition.

The sensor output signals are also used to develop an actual speed signal for use by the feedback control. In general terms, the feedback control of the present invention employs closed-loop processes, the actual speed signals and an operator command to generate a current command. The current command serves to limit the magnitude of actual phase current. The feedback control also generates a turn-on angle signal and a pulsewidth angle signal for the stator phase current pulses. The values of the turn-on angle and pulsewidth angle signals are coordinated with the particular quadrant in which the motor is operating. The feedback control operates on speed and/or torque.

Figure 8:
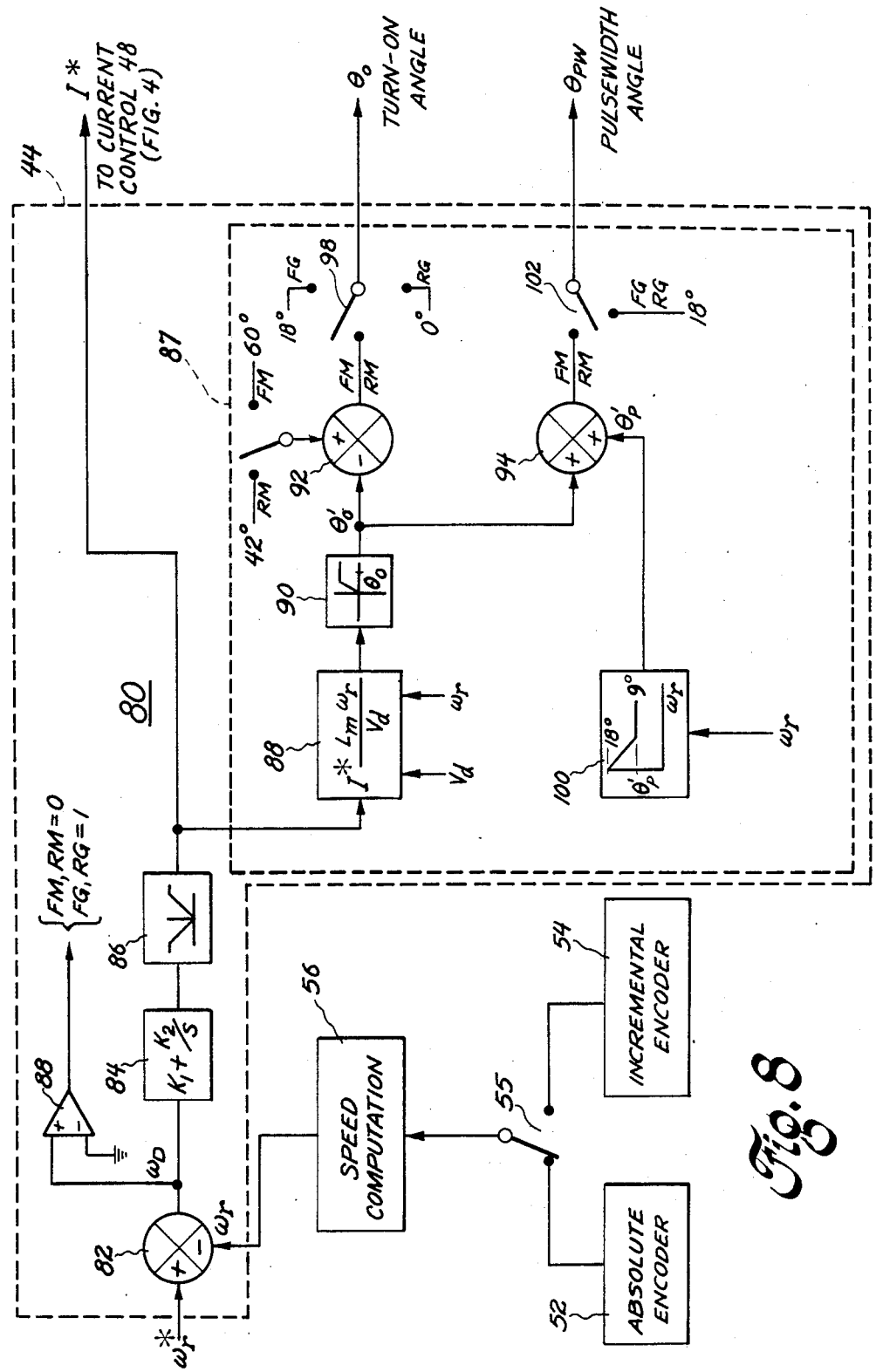
FIG. 8 illustrates, in block diagram form, an embodiment of a speed control loop of the present invention.

FIG. 8 illustrates a speed control loop 80 which can be used to implement feedback control 44 of FIG. 4. Loop 80 includes a comparator 82 for comparing a speed command $\omega_r^*$ with actual speed $\omega_r$ and generating a speed difference signal $\omega_D$ therefrom. The speed command is operator inputted while the actual speed is calculated by speed calculator 56 from rotor position information signals provided by either absolute encoder 52 or incremental encoder 54 (as shown in FIG. 4).

The speed difference signal from comparator 82 is processed by a proportional-integral (PI) compensator 84 and absolute value circuit 86 to produce current command I*. The speed difference signal is also applied to the negative input of a polarity detector 88, the positive input of which is grounded. The output signal of polarity detector 88 is used to differentiate between motoring quadrants and generation quadrants and, as more fully described hereinafter, is employed to coordinate turn-on and pulsewidth angles with SRM operating quadrant.

Current command I* is provided to current control 48, shown in FIG. 4, and to a $\theta_o$ and $\theta_{pw}$ computation subsystem 87. In this subsystem, advance angle $\theta_o'$ is calculated from I*, in accordance with equation (2) as labeled on polarity detector 88, so that in motoring quadrants the current builds up at the beginning of the positive inductance slope. The turn-on angle $\theta_o$ and pulsewidth angle $\theta_{pw}$, in different quadrants, are programmed with different values. These values are summarized in the following table:

| Quadrant | $\theta_o$ | $\theta_{pw}$ |
| --- | --- | --- |
| Forward Motoring (FM) | $60° - \theta_o'$ | $\theta_o' + \theta_p'$ |
| Reverse Motoring (RM) | $42° - \theta_o'$ | $\theta_o' + \theta_p'$ |
| Foward Braking (FG) | 18° | 18° |
| Reverse Breaking (RG) | 0° | 18° | where $\theta_p'$ is the angle between the positive inductance slope corner point and the transistor turn-off point, as shown in FIG. 2b. In the FM mode, the turn-off angle $\theta_p = \theta_p'$, but in the RM mode $\theta_p = 42° + \theta_p'$.

The maximum value of $\theta_o$ is clamped, as indicated by clamp circuit 90, to prevent contribution of braking torque by the preceding negative slope of the inductance profile. The output signal of clamp circuit 90 is provided to a comparator 92 and summer 94. Comparator 92 is connected to selection switches 96 and 98 as shown in FIG. 8, and in conjunction therewith provides a quadrant-coordinated turn-on angle signal $\theta_o$ in accordance with the above table.

Summer 94 is provided with a second input signal $\theta_p'$. The $\theta_p'$ angle is made a function of actual speed $w_r$ by computation circuitry 100, as labeled thereon, to minimize the influence of braking torque. The output signal of adder 94 is provided as an input signal to selection switch 102. As shown, the other input signal to selection switch 102 is fixed angle of 18°. The output signal of switch 102 is a quadrant coordinated pulsewidth angle signal $\theta_{pw}$ having a value in accordance with the abovepresented table.

The positions of switches 96, 98 and 102 are coordinated with the SRM operating quadrant, in well-known manner. Differentiation between motoring and braking states is provided by polarity detector 88, as previously discussed. Differentiation between forward and reverse directions is provided by a direction of rotation detector described hereinafter in conjunction with FIG. 12. The values of the turn-on and pulsewidth angle signals are thus coordinated with the particular quadrant in which the SRM is operating.

Figure 9:
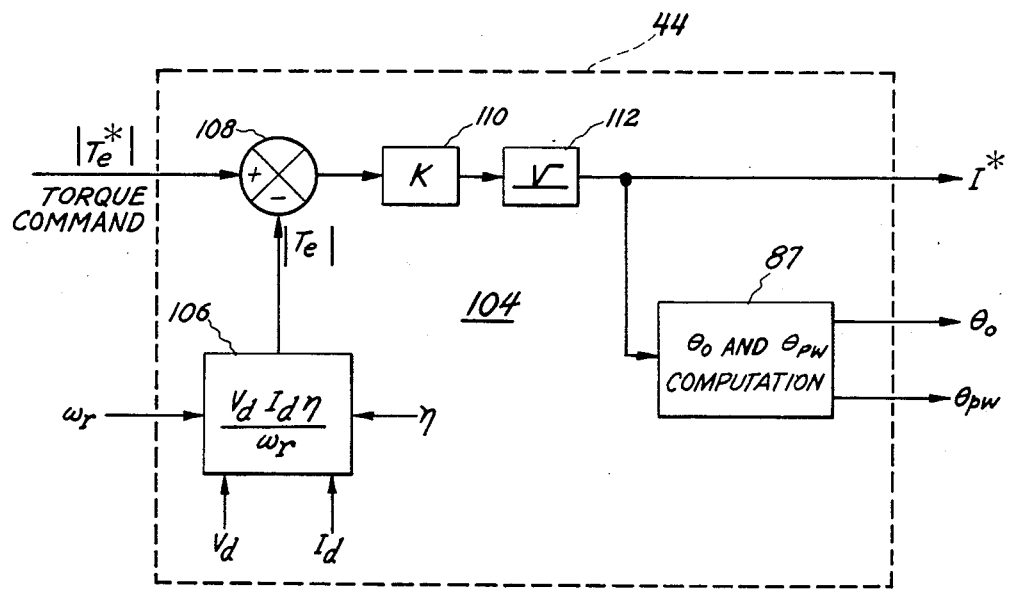
FIG. 9 shows, in block diagram form, an embodiment of a torque control loop.

A block diagram of a torque control loop implementation of the feedback control 44 of FIG. 4 is shown in FIG. 9. Consideration of torque control is important, for example, in electric vehicle-type applications. In addition, providing a torque loop within a speed loop (FIG. 10) can make the response of the speed loop faster. The implementation of torque feedback control in an SRM is difficult because computation of accurate feedback torque is difficult. Instantaneous torque can be computed from the DC link power by the following relationships:

$$T_e = (V_d I_d \eta / \omega_r) \quad (3)$$

$$T_e = (V_d I_d \eta \omega_r) \quad (4)$$

where $\eta$ is the combined efficiency of the converter and machine. These expressions neglect delay due to the energy storage effect in inductances. Experimentation indicates that torque thus computed shows a reasonably good correlation with measured torque except in the low speed region where excessive ripple is present.

As shown in FIG. 9, only the absolute value of torque is controlled, and the polarity command actuates quadrant selection switches in computation subsystem 87 as previously discussed in regard to FIG. 8. Torque loop 104 is active for positive error only. For monitoring quadrants, the absolute value of actual torque $|T_e|$ is calculated by computation circuit 106 in accordance with equation (3). Comparator 108 compares $|T_e|$ with the absolute value of a torque command $|T_e^*|$. The output signal of comparator 108 is processed by a proportional gain circuit 110 and limiter 112 to generate current command signal I*. The current command signal is applied to current control 48, as shown in FIG. 4, and to computation circuit 87 which computes $\theta_o$ and $\theta_{pw}$, as previously described with reference to FIG. 8.

Figures 10, 11:
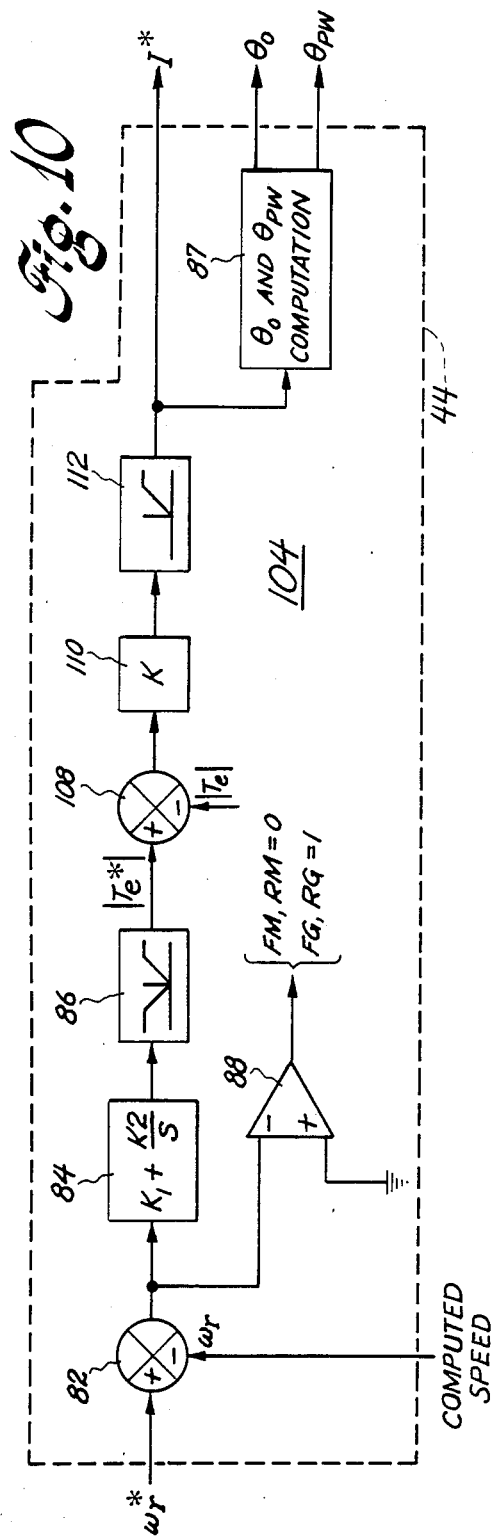
FIG. 10 illustrates, in block diagram form, an embodiment of a speed control loop with an inner torque control loop.
FIG. 11 is a simplified block diagram of a preferred embodiment of the angle control of the present invention.

Torque control loop 104 of FIG. 9 can be implemented within a speed loop, as shown in FIG. 10, to enhance the system response speed. In this embodiment, like elements have been labeled with like reference numerals and operate in the same manner as earlier described. A high gain torque loop within the speed loop linearizes the system, makes performance insensitive to parameter variation, and permits the speed loop control gain to be high within the limit of stability. The overall system operates in four quadrants with the absolute value of the torque control in the inner loop.

The control system of the present invention incorporates a digital angle control 46 which receives the turn-on and pulsewidth angle signals from feedback control 44, as shown in FIG. 4, and translates them into transistor conduction angle pulsetrains which are synchronized to rotor position. A preferred embodiment of the angle control is shown, in simplified block diagram form, in FIG. 11. Angle control 46 includes processor 70 which receives rotor position information signals $S_1$–$S_4$ and generates therefrom a multiphase sync pulsetrain M and individual stator phase sync signals for each of the stator phases. A phase-locked loop (PLL) 114 receives and processes pulsetrain M to generate a resolution signal (M/N), which is a phase-locked, frequency-multiplied derivative of M. The resolution signal from PLL 114, the individual phase sync signals from processor 70 and turn-on and pulsewidth signals from feedback control 44 of FIG. 4 are provided to counter/timers 72. Counter/timers 72 generate angle pulsetrains $AP_A$, $AP_B$, $AP_C$ and $AP_D$ of current pulses synchronized with rotor position, for the respective stator phases. Each current pulse has a turn-on angle and pulsewidth corresponding to the value of the turn-on angle signal and pulsewidth angle signal for the particular quadrant in which the SRM is operating. The pulsetrains from counter/timers 72 are provided to current control 48 of FIG. 4 when the SRM is in a feedback mode.

A logic circuit for implementing signal processor 70 is shown in FIG. 12. Output signals $S_1$, $S_2$, $S_3$ and $S_4$ from the optical sensors of rotor position encoder 52, shown in FIG. 6, are provided to monostable multivibrators 116, 118, 120 and 122, respectively. Each monostable multivibrator captures a 1-to-0 transition of its respective input signal and outputs and individual phase sync signal for the respective stator phase. For the SRM of FIG. 1a, each individual phase sync signal consists of pulses occurring every 60 degrees. The output signals of monostable multivibrators 116, 118, 120 and 122 are also coupled together through an OR gate 124 to generate multiphase sync pulsetrain M. In the illustrated embodiment, the pulses in pulsetrain M occur every 15 degrees. As shown in FIG. 7, pulsetrain M appears in the pulse sequence 4-3-2-1 for forward rotation. The pulses appear in the opposite sequence for reverse rotation. The direction of rotation can be detected by the presence or absence of a 0-to-1 transition of the $S_2$ signal within pulses 1 and 4 of pulse-train M.

Referring again to FIG. 12, a fifth monostable multivibrator 126 detects a 0-to-1 transition of signal $S_2$ and generates a test pulse T. An RS flip-flop 128 receives the output signal of monostable multivibrator 116 at its set input S and the output signal of monostable multivibrator 122 at its reset input R. The output of flip-flop 128 is coupled to the non-inverting input J and, through an inverter 131, to the inverting input K of JK flip-flop 130. Pulsetrain T from monostable multivibrator 126 is provided to the clock input $C_K$ of flip-flop 130. The output signal of flip-flop 130 has a logic value of 1 for forward rotation and a logic value of 0 for reverse rotation. These circuit elements thus act as a direction of rotation detector, the output signal of which can be advantageously employed, as earlier described, for quadrant coordination by the feedback control.

Figure 13:
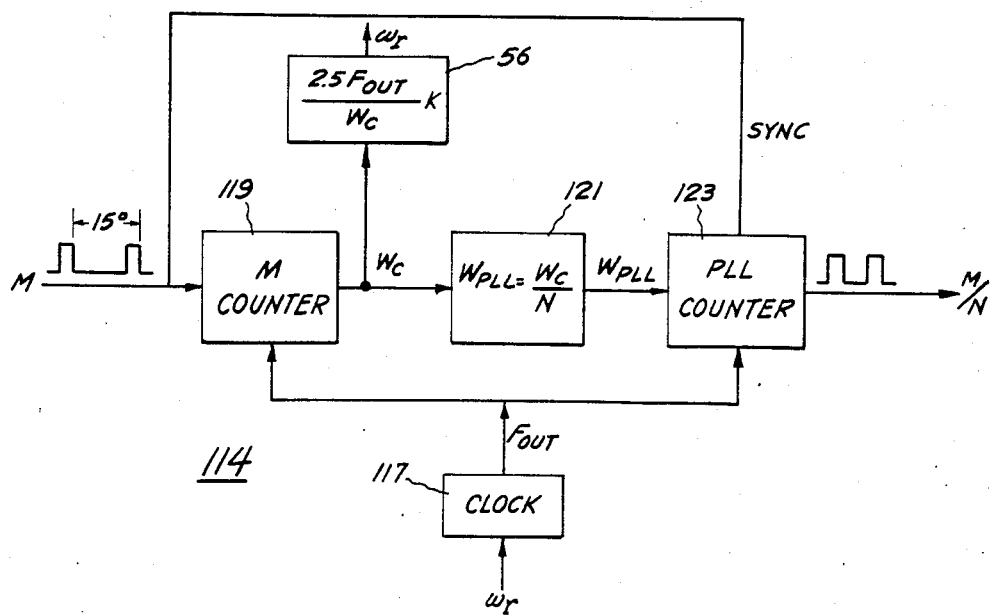
FIG. 13 illustrates, in block diagram form, a phase-locked loop for generating a resolution signal.
Figure 15A:
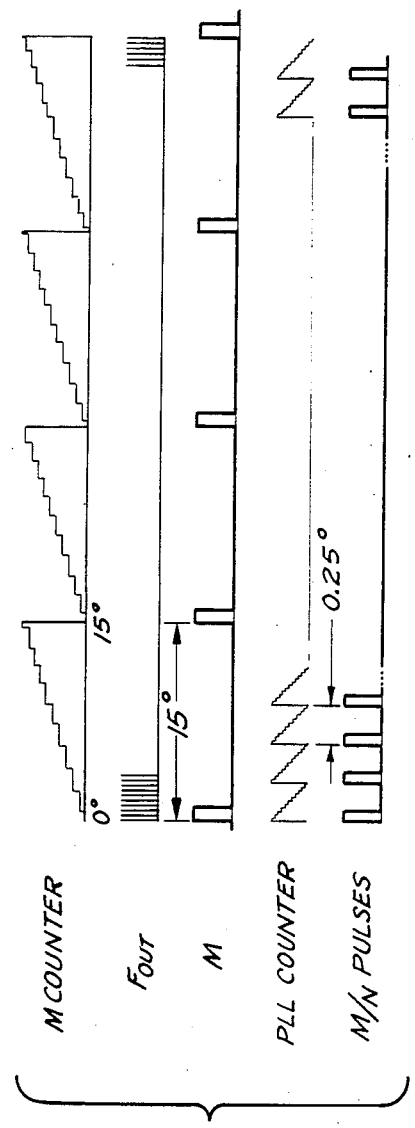
FIG. 15a illustrates waveforms helpful in understanding operation of the phase-locked loop of the angle control.

As shown in FIG. 13, pulsetrain M from processor 70 of FIG. 12 is applied to digital phase-locked loop 114 (as shown in FIG. 11) to generate a resolution signal (M/N), which is a phase-locked, frequency-multiplied signal derived from M. The pulse interval of the resolution signal constitutes the resolution of the control angles. A clock 117, preferably programmable, generates clock pulses $F_{out}$. An M counter 119 receives the multiphase sync pulsetrain M and accumulates the $F_{out}$ pulses during the interpulse interval of pulsetrain M. The resulting digital word $W_C$ is divided by N in frequency multiplier 121 to generate the work $W_{PLL}$ for a PLL counter 123. The PLL counter in down-counted by the $F_{out}$ clock pulses. When counter 123 clears, a pulse is generated at the output and counter 123 reloads automatically from its buffer. A phase-synchronized pulsetrain (M/N) at higher frequency is thus generated by the PLL counter. By varying N, the frequency multiple and thus the resolution of signal (M/N) can be varied. FIG. 15a depicts waveforms for a PLL counter in which the interpulse interval of pulsetrain M is 15 degrees, N=60, and the interpulse interval of the resolution signal is 0.25 degrees.

An actual speed signal $\omega_r$ can be calculated by speed calculator 56 from the M counter output signal, as indicated by the expression labeled on speed calculator 56, because the actual speed is inversely proportional to the work $W_C$. Clock 117 is made programmable with speed to maintain good resolution of the resolution signal pulses and to prevent an overflow of the M counter at very low speed. At low speed, $F_{out}$ if programmed low, and increases in steps as speed increases. Since the same clock 117 triggers both the M counter and PLL counter, the respective time intervals remain proportional to their digital words. The PLL counter is synchronized by pulsetrain M.

Figure 14:
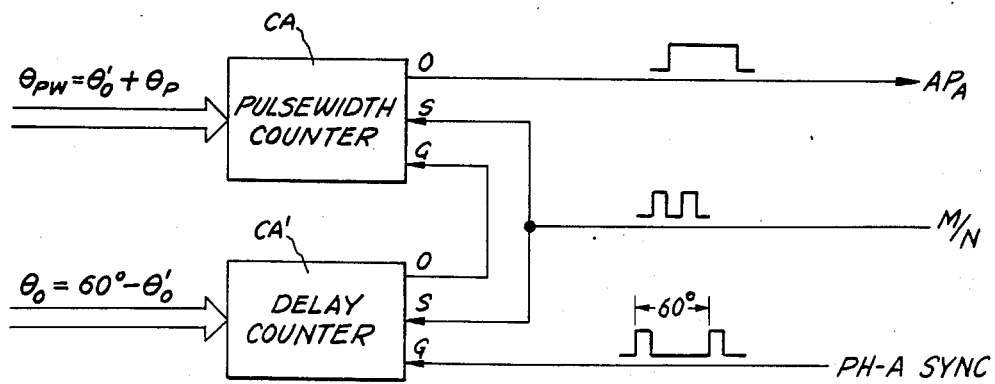
FIG. 14 illustrates, in block diagram form, a set of programmable counters for a single stator phase, which are useful in the angle control of the present invention.
Figure 16:
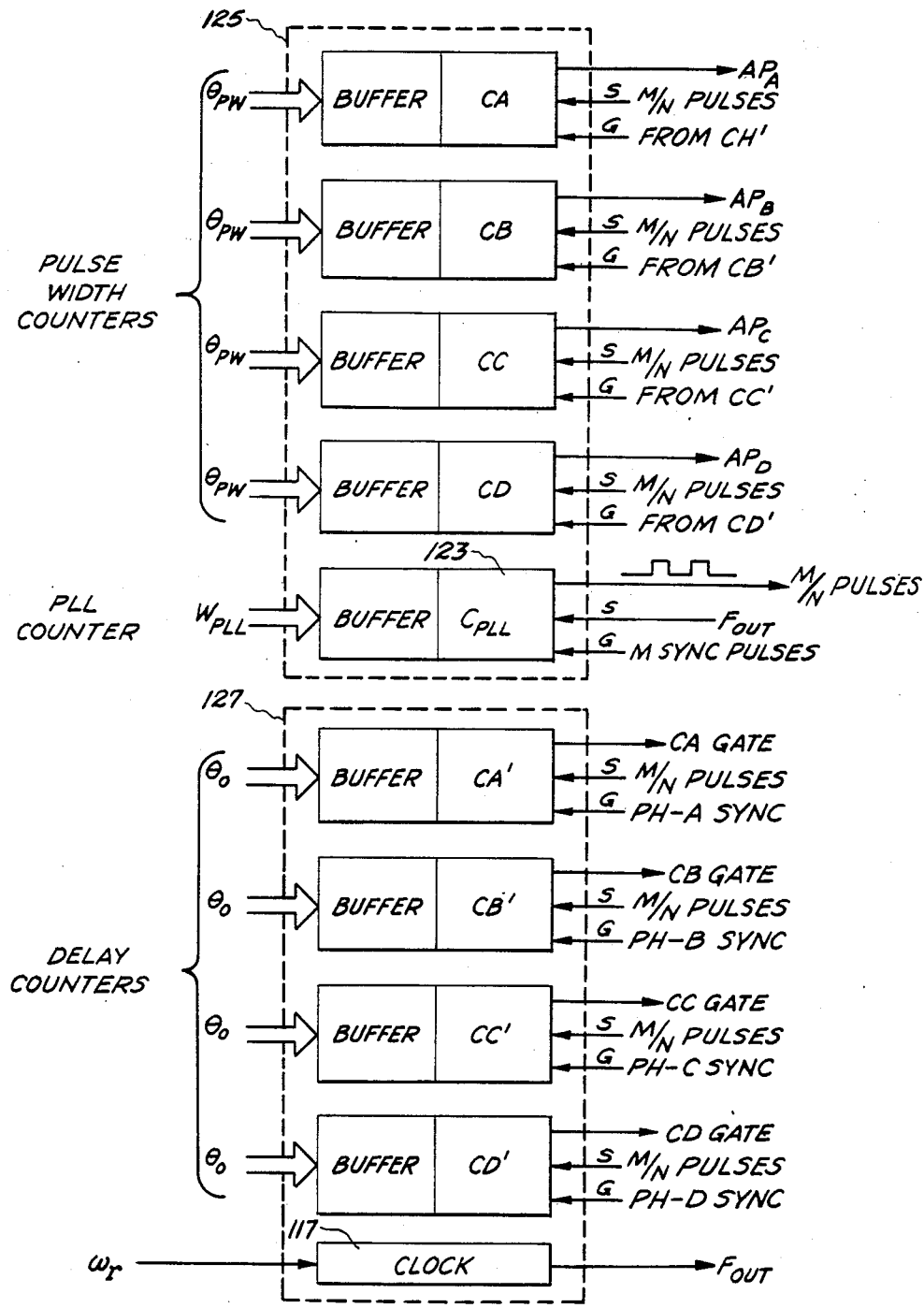
FIG. 16 illustrates, in block diagram form, programmable counters for four phases.

Angle control 46 of the drive system, shown in FIG. 4, also includes four pairs of programmable downcounters, all of which are shown in FIG. 16. The pair of down-counters for phase PH-A is shown in FIG. 14 and will now be described. The pairs of counters for the other stator phases operate identically and therefore will not be individually described in detail.

Figure 15B:
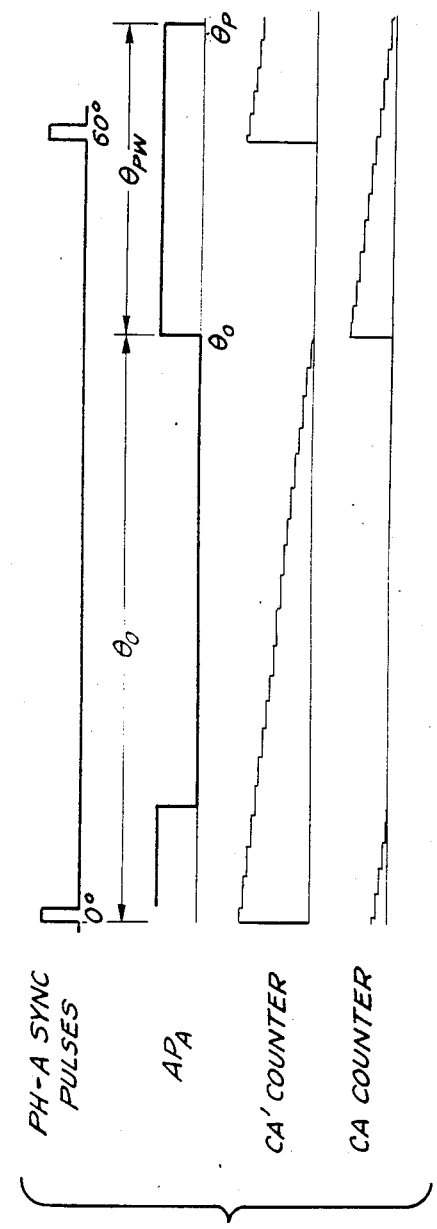
FIG. 15b illustrates waveforms helpful in understanding operation of the counter/timers of the angle control.

Referring now to FIG. 14 which illustrates the pair of programmable counters for generating angle pulsetrain $AP_A$, and FIG. 15b which depicts corresponding waveforms for the forward motoring quadrant, it will be seen that a delay counter CA' and a pulsewidth counter CA are provided. Each counter operates as a programmable one-shot where the digital words $\theta_{pw}$ ($=\theta_o' + \theta_p'$ for forward motoring) and $\theta_o (=60° - \theta_o'$ for forward motoring) are loaded into a buffer of the pulsewidth counter and delay counter, respectively. Both counters are clocked by pulse-train M (not shown). Delay counter CA' is enabled by PH-A SYNC signal pulses. When delay counter CA' clears at angle $\theta_o$, it enables the pulsewidth counter, which maintains a logic 1 at its output during the countdown period. When the pulsewidth counter clears, it reloads itself from its buffer and locks until enabled again, producing the angle control pulsetrain $AP_A$.

In FIG. 16, the upper string of four counters, CA, CB, CC and CD comprise the pulsewidth counters and the lower string of counters CA', CB', CC' and CD' constitute the delay counters for the respective stator phases. Signal $\theta_{pw}$ is supplied to the buffer of each of the pulsewidth counters while signal $\theta_o$ is supplied to the buffer of each of the delay counters. Signals $\theta_{pw}$ and $\theta_o$ are generated by feedback control 44, shown in FIG. 4, as previously described or, if feedback is not employed, are provided open-loop.

As shown in FIG. 16, the output of each delay counter is connected to gate G of the corresponding pulsewidth counter, respectively. Each delay counter is gated on, at 15 degree sequence, by the respective individual phase sync signal. All of the delay and pulsewidth counters are clocked by (M/N) pulses which define the angular resolution. The output signals of the pulsewidth counters represent the angle control pulsetrains for each of the respective stator phases. Since the delay and pulsewidth counters are independent, each can be programmed independently between 0° and 60°, which is important for four-quadrant operation. The counter buffers can be updated typically at 3.33 millisecond intervals when feedback control is utilized.

The pulsewidth and delay counters may be implemented using two system timing control chips 125 and 127. For this purpose, AM9513 chips manufactured by Advanced Micro Devices may be used. Each chip has five software configurable counter/timers as well as a programmable frequency divider. Each of the five counters may be configured in one of 24 possible operating modes. As shown in FIG. 16, chip 125 may include PLL counter 123 (designated $C_{PLL}$) of FIG. 13 as well as the four pulsewidth counters. Chip 127 may include programmable clock 117 (shown in FIG. 13) as well as the four delay counters.

Figure 17:
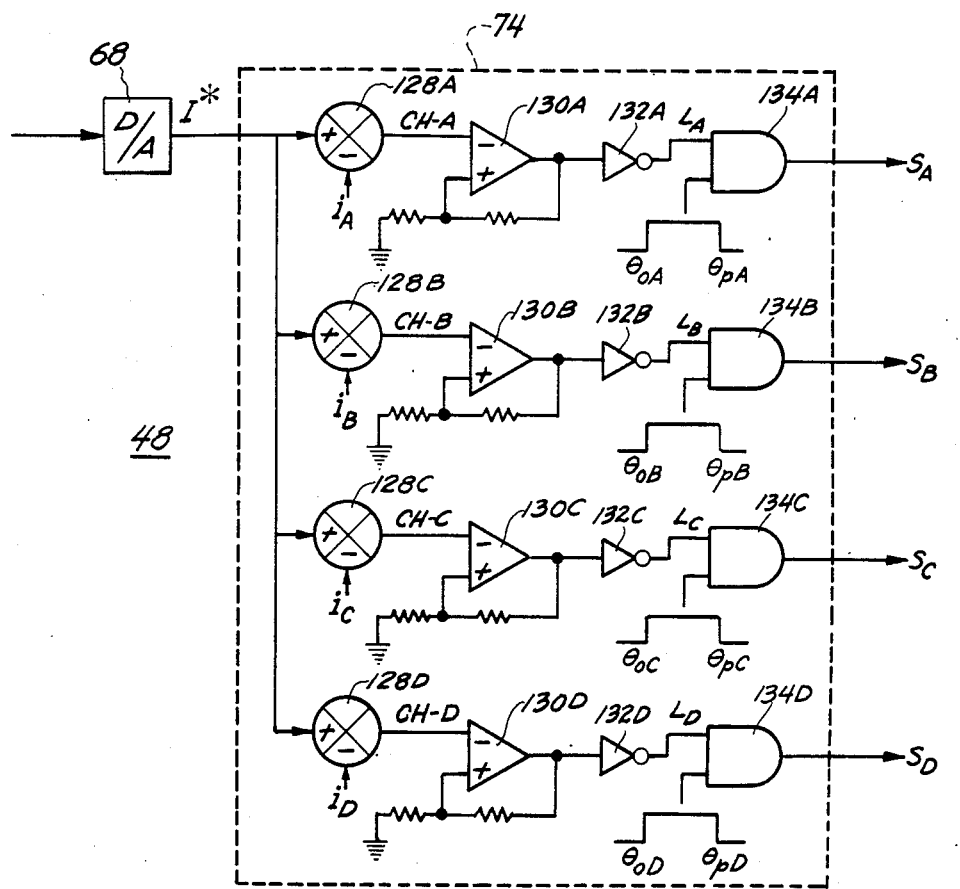
FIG. 17 schematically illustrates an embodiment of the current control of the present invention.

A preferred embodiment of current control 48 of the present invention is illustrated in FIG. 17. Current command I* is coupled through digital-to-analog converter 68 to four parallel-connected channels CH-A, CH-B, CH-C and CH-D. Each of the channels is associated with an individual stator phase and since they all operate identically, only channel CH-A is described herein. Channel CH-A includes a comparator 128A for comparing the current command with actual phase current $i_A$. The current difference output signal from comparator 128 actuates a Schmitt trigger 130A to produce output pulses which are inverted in an inverter 132A, resulting in a current magnitude limiting signal $L_A$. AND gate 134 couples limiting signal $L_A$ and the angle pulsetrain $AP_A$, in feedback mode, or the start-up pulse $SP_A$, in start-up mode, to form transistor switching signal $S_A$. Transistor $T_A$ (FIG. 1b) will conduct if signal $L_A = 1$ and angular pulsetrain $AP_A = 1$. Schmitt trigger 130A in effect creates a hysteresis band about current command I*. The current control maintains the amplitude of the actual current of each stator phase within this hysteresis band up to a base motor speed $\omega_b$, and limits the peak amplitude of the actual current of each stator phase to the maximum value of the hysteresis band beyond the base speed. The current control thus acts as a bang-bang controller in the constant torque region and as a current limiter in the constant power region of the torquespeed curve shown in FIG. 3. In the latter region, the current control becomes active if the phase current exceeds the minimum value of the hysteresis band surrounding the command current.

The other channels of current control 48 operate identically to channel CH-A and together they produce the phase-shifted switching control signals for the transistors of the power converter.

Figure 18:
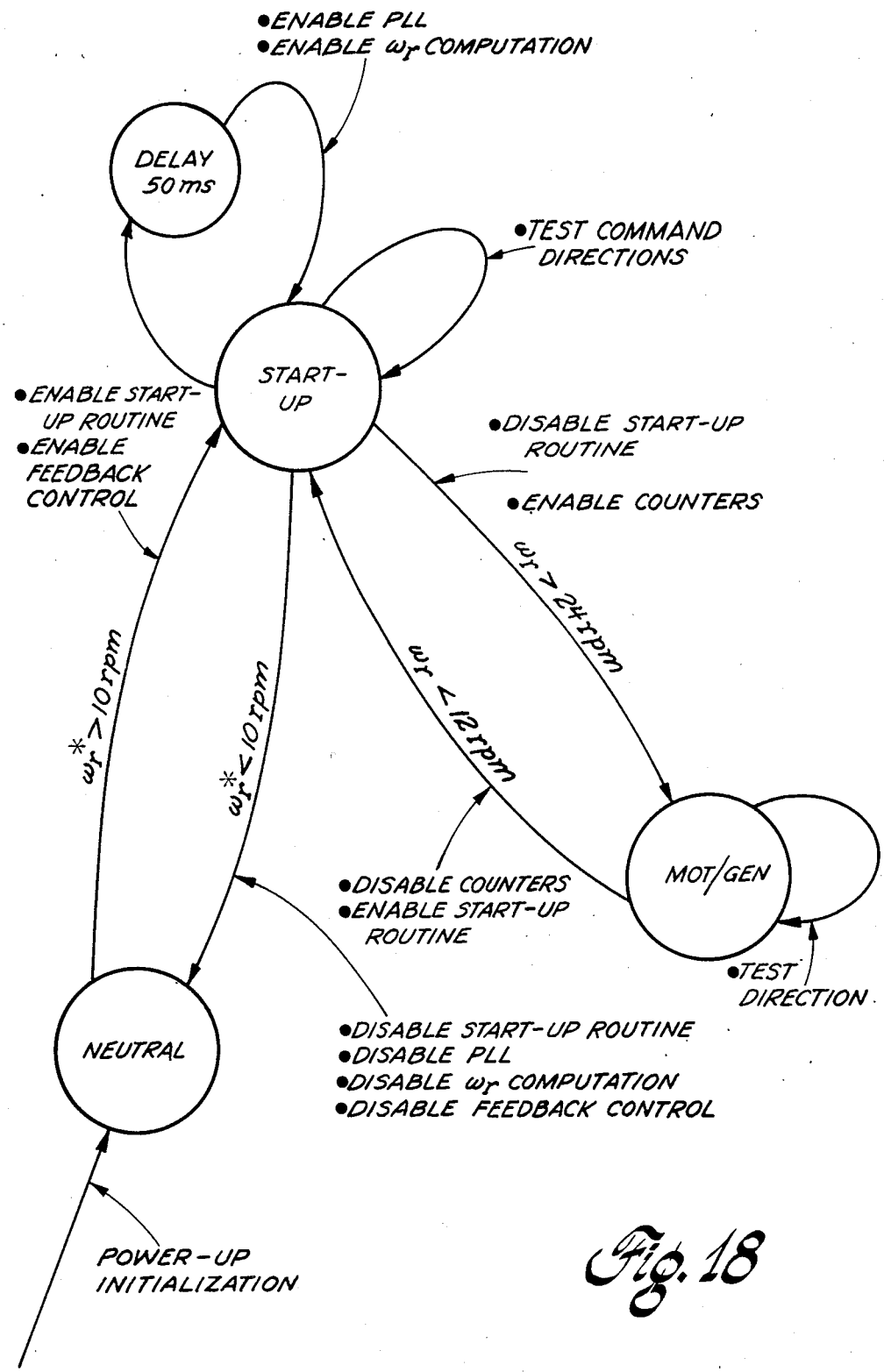
FIG. 18 is a simplified sequence diagram for a switched reluctance motor operating with the control system of the present invention.

The SRM drive system has several modes of operation with permissible transition paths shown by the sequence diagram of FIG. 18. The normal running modes (FM, RM, FG and RG) are grouped into the MOT/GEN mode. For a successful transition between modes, the conditions as written along the arrows should be valid, and then the action routines (identified by dots) are executed before the transition occurs.

The control system initially attains the NEUTRAL mode after power is switched on. The system then transitions to the START-UP mode if the speed command exceeds a threshold value, e.g. 10 rpm. Meanwhile, enabling the feedback loop builds up the current command through the PI compensator. The phase-locked loop and speed computation are enabled with a delay of 50 ms to insure a minimum speed so that the M and PLL counters do not overflow. When the speed exceeds a predetermined speed, e.g. 24 rpm as shown, the system transitions to the MOT/GEN mode but returns to the START-UP mode if the speed falls below 12 rpm. This speed hysteresis band prevents faulty chattering between the modes. Should the speed fall below 10 rpm, the system transitions to the NEUTRAL mode, resulting in the disabling actions indicated in FIG. 18.

As described earlier, many of the functions of the control system of the present invention can be implemented by a programmable microcomputer, which ensures simplicity, flexibility, accuracy and extreme hardware simplification. The control system of the present invention was laboratory-tested using an Intel 8751 microcomputer-based control to drive a 5 horsepower SRM. The angle control was partially implemented with dedicated digital hardware because of its critical timing requirement. The actual speed signal was synthesized from an optical position encoder in the higher speed range, whereas in the lower speed range an incremental speed sensor, manufactured by Teledyne, Inc. was used. The feedback torque was computed from electrical signals and was valid, except at very low speeds due to excessive ripple. The complete drive system was tested thoroughly in all the four quadrants under both steady-state and transient conditions, and performance was found to be excellent.

It will thus be apparent that a closed-loop, fourquadrant control system for a switched reluctance motor has been developed which satisifes all of the objects of the present invention. While preferred embodiments of the present invention have been shown and described herein, it will be obvious to those skilled in the art that such embodiments are provided by way of example only. Numerous variations, changes, departures, substitutions and partial and full equivalents will now occur to those skilled in the art without departing from the invention. Accordingly, it is intended that the invention be limited only by the spirit and scope of the appended claims.

What is claimed is:

1. A closed-loop control system for a multiphase switched reluctance motor in which the current of each stator phase is controllably switched on and off in synchronism with rotor position, comprising:
   encoder means for generating rotor position information signals;
   speed computation means for generating an actual speed signal from said rotor position information signals;
   feedback control means for receiving and processing said actual speed signals from said speed computation means and for receiving an operator command to generate a current command, a turn-on angle signal and a pulsewidth angle signal;
   angle control means connected to said feedback control means for receiving and converting said turn-on angle signal and pulsewidth angle signal into a pulsetrain of conduction angle pulses synchronized with rotor position for each stator phase, the pulsetrains for the different stator phases being mutually phase-shifted; and
   current control means for receiving and comparing the current command from said feedback control means with the actual current of each stator phase to generate a current magnitude limiting signal for each stator phase, said current control means also receiving the pulsetrains from said angle control means, said current control means having coupling means for combining the pulsetrain for each phase with the current magnitude limiting signal for said each phase, respectively, to generate a stator current control pulsetrain for each of said stator phases.

2. The control system of claim 1 further comprising:
   start-up control means for receiving and processing the rotor position information signals from said encoder means and a direction command to generate a start-up pulse for at least one selected stator phase, said selected stator phase depending upon initial rotor position and commanded direction of rotation; and
   switching means for disabling said angle control means during a start-up mode and connecting an output of the start-up control means to said coupling means of said current control means so as to combine the start-up pulse for the selected phase with the current magnitude limiting signal for the selected phase, and further for disabling said start-up control means upon motor transition from said start-up to a motoring mode.

3. The control system of claim 1 wherein the encoder means comprises an absolute rotor position encoder.

4. The control system of claim 3 wherein said absolute rotor position encoder comprises an optical sensor associated with each stator phase and selectively located with regard to a stator pole of the associated phase, and an interrupting type disk with the same profile as the rotor, aligned and mounted to rotate with the rotor and interrupt or not interrupt optical energy directed onto the sensors in accordance with rotor position.

5. The control system of claim 4 wherein the encoder means further comprises an incremental position encoder.

6. The control system of claim wherein the current control means comprises a bang-bang current controller.

7. The control system of claim 6 wherein the bang-bang current controller includes means for maintaining amplitude of actual current in each stator phase within a hysteresis band of the current command up to a base motor speed, and means for limiting peak amplitude of the actual current in each stator phase to the maximum value of said hysteresis band beyond said base speed.

8. The control system of claim 7 wherein the current control means comprises a channel associated with each respective stator phase, each said channel comprising comparison means for comparing the current command with the actual current signal for the phase associated with said channel to generate a current difference signal, a Schmitt trigger circuit for receiving and processing said current difference signal for said channel to generate the current magnitude limiting signal for said phase associated with said channel, an AND gate, and means for coupling said Schmitt trigger circuit to said AND gate, said AND gate being further responsive to the conduction angle pulsetrain for said channel to produce the stator current control pulsetrain for said phase associated with said channel.

9. The control system of claim 2 wherein said speed computation means, feedback control means and startup control means together comprise a programmable microcomputer.

10. The control system of claim 2 wherein said speed computation means, feedback control means, startup control means and angle control means together comprise a programmable microcomputer, said angle control means further including programmable counter means.

11. The control system of claim 1 whrein the switched reluctance motor is capable of operating in four quadrants and the feedback control means further comprises quadrant coordination means for coordinating the turn-on angle signal and the pulsewidth angle signal with a particular quadrant in which the motor is operating.

12. The control system of claim 1 wherein the operator command comprises a speed command and the feedback control means comprises a speed feedback loop.

13. The control system of claim 12 wherein the feedback control means further comprises a torque feedback loop within said speed feedback loop.

14. The control system of claim 1 wherein the operator command comprises a torque command and said feedback control means comprises a torque feedback loop.

15. The control system of claim 1 in combination with a power converter, the power converter comprising a power supply for impressing a DC link voltage across parallel stator phase windings, a stator winding of said each phase being connected in series with a respective current switching device across the source of said DC link voltage, the current switching device of said each phase receiving and being responsive to the stator current control pulse-train for said each phase.

16. The control system of claim 15 wherein said current switching devices comprise transistors and the stator current control pulsetrain for said each respective phase is applied to the base of the transistor respectively connected thereto.

17. The control system of claim 15 further in combination with a switched reluctance motor having the phase winding of said each respective phase coiled around a respective pair of opposing stator poles.

18. A method of controlling a multiphase switched reluctance motor in a closed loop fashion which facilitates motor operation in four quadrants, comprising the steps of:
(a) continually comparing one of:
  1. actual motor speed with commanded motor speed;
  2. actual motor torque with commanded motor torque; and
  3. actual motor speed and torque with commanded motor speed and torque,
  to generate a feedback current command;
(b) generating mutually phase-shifted pulsetrains for the respective stator phases of said motor, each of said pulsetrains comprising conduction angle pulses synchronized with the rotor position of said motor and coordinated with an inductance profile of the motor in accordance with a selected quadrant of motor operation;
(c) switching on and off the actual current in each respective stator phase of the motor in correspondence with the pulsetrain for said respective phase;
(d) limiting amplitude of the actual current for each said respective phase to a value substantially within a hysteresis band surrounding the current command for speeds below a base value; and
(e) Limiting peak amplitude of the actual current in each said respective phase to a maximum of said hysteresis band when the speed of the motor exceeds said base speed.

19. A feedback control for a switched reluctance motor, the motor having multiple stator phases to be sequentially switched on and off in synchronism with rotor position by phase current pulses, the magnitude, turn-on angle and pulsewidth angle of said phase current pulses being determined by the feedback control so as to facilitate smooth operation throughout the full speed range of the motor in four quadrants of operation, the feedback control comprising:
processing means for receiving and closed-loop processing an actual motor speed signal and an operator command to generate a current command, the current command serving to limit the magnitude of actual phase current;
angle computation means for generating a turn-on angle signal and a pulsewidth angle signal or said phase current pulses; and
coordination means for coordinating the turn-on angle signal and the pulsewidth angle signal with a particularly quadrant in which the motor is operating.

20. The feedback control of claim 19 wherein the angle computation means comprises advance angle computation means for computing an advance angle as a function of current command for forward and reverse motoring quadrants.

21. The feedback control of claim 20 wherein the advance angle is computed in accordance with the following equation:

$$\theta_o' = I^*(L_m\omega_r/V_d)$$

wherein $\theta_o'$ = the advance angle, $I^*$ = current command, $L_m$ = minimum inductance of the motor, $\omega_r$ = actual motor speed, and $V_d$ = DC link voltage impressed across each stator phase.

22. The feedback control of claim 21 wherein the advance angle computation means further comprises clamping means for limiting the maximum value of advance angle.

23. The feedback control of claim 22 wherein said angle computation means further comprises adaptive means for making said pulse width angle signal a function of actual speed.

24. The feedback control of claim 19 wherein said operator command comprises a speed command and said processing means comprises a speed feedback loop.

25. The feedback control of claim 24 wherein said processing means comprises comparison means for comparing the speed command with the actual speed signal and generating a speed difference signal therefrom, and a proportional-integral converter in series with an absolute value circuit for processing said speed difference signal to generate the current command.

26. The feedback control of claim 25 wherein said coordination means comprises polarity detection means for determining polarity of the speed difference signal.

27. The feedback control of claim 24 wherein said speed feedback loop further comprises an inner torque feedback loop.

28. The feedback control of claim 27 wherein said inner torque loop comprises: torque computation means for computing actual torque as a function of actual speed, DC link voltage impressed across each of said stator phases, link current, and efficiency of the motor and its associated converter; comparator means for comparing absolute value of actual torque with absolut value of a torque command, to generate a torque difference signal; and proportional gain means and limiter means connected in series for processing the torque difference signal to produce the current command.

29. The control system of claim 28 wherein said torque computation means computes actual torque for motoring quadrants in accordance with the following equation:

$$T_e = (V_d I_d \eta / \omega_r)$$

and for regeneration quadrants in accordance with the following relationship:

$$T_e = (V_d I_d / \eta \omega_r)$$

wherein $T_e$ = actual torque, n = combined efficiency of the motor and converter, $V_d$ = DC link voltage, $I_d$ = link current and $\omega_r$ = actual speed.

30. The feedback control of claim 19 wherein said operator command comprises a torque command and said processing means comprises a torque feedback loop.

31. The feedback control of claim 30 wherein said torque loop comprises: torque computation means for computing actual torque as a function of actual speed, DC link voltage impressed across each of said stator phases, link current, and efficiency of the motor and its associated converter; comparator means for comparing absolute value of actual torque with absolute value of a torque command to generate a torque difference signal; and proportional gain means and limiter means connected in series for processing the torque difference signal to produce the current command.

32. The feedback control of claim 31 wherein said torque computation means computes actual torque for motoring quadrants in accordance with the following equation:

$$T_e = (V_d I_d \eta / \omega_r)$$

and computes actual torque for regeneration quadrants in accordance with the following relationship:

$$T_e = (V_d I_d / \eta \omega_r)$$

where $T_e$ = actual torque, $\eta$ = combined efficiency of the motor and converter system $V_d$ = DC link voltage, $I_d$ = link current and $\omega_r$ = actual speed.

33. The feedback control of claim 19 wherein said processing means, angle computation means and coordination means together comprise a programmable microcomputer.

34. The feedback control of claim 19 further comprising, in combination, rotor position encoder means responsive to actual rotor position and actual speed computation means coupled to said rotor position encoder means for generating said actual speed signal.

35. The feedback control of claim 19 wherein said angle computation means comprises means for independently programming turn-on angle and pulsewidth angle for different quadrants of operation.

36. A method of controlling a multiphase switched reluctance motor in a closed-loop fashion which facilitates motor operation in four quadrants, comprising the steps of:
 (a) continually comparing one of:
  1. actual motor speed with commanded motor speed;
  2. actual motor torque with commanded motor torque; and
  3. actual motor speed and torque with commanded motor speed and torque,
  to generate a feedback current command;
 (b) generating a turn-on angle signal which for at least one quadrant of motor operation is a function of said feedback current command;
 (c) generating a pulsewidth angle signal which for at least one quadrant of motor operation is a function of said feedback current command and actual motor speed; and
 (d) processing said current command, turn-on angle signal and pulsewidth angle signal to generate switched reluctance motor stator phase current pulses.

37. A digital angle control for a switched reluctance motor, the motor having multiple stator phases to be sequentially switched on and off by current pulses applied to the respective stator phases, the digital angle control controlling timing of said current pulses for application to the respective stator phases, said control comprising:
 signal processing means for receiving and processing rotor position information signals to generate a multiphase sync pulsetrain and individual stator phase sync signals for the respective stator phases;
 PLL means for receiving said multiphase sync pulsetrain and generating a resolution signal therefrom, the resolution signal being a phase-locked, frequency-multiplied derivative of said multiphase sync pulsetrain; and
 programmable counter means for receiving a turn-on angle signal, a pulsewidth angle signal, said resolution signal and the individual stator phase sync signals and generating a train of current pulses synchronized with rotor position for each of said stator phases, each of said current pulses having a turn-on angle and pulsewidth corresponding to said turn-on angle signal and pulsewidth angle signal, respectively.

38. The digital angle control of claim 37 wherein the programmable counter means comprises a pair of counters for each of said stator phases, respectively, each said pair comprising a delay counter and an associated pulsewidth counter, each said pair receiving said resolution signal at a source terminal thereof; the delay counter of each said pair being adapted to receive the turn-on angle signal as an input signal, to be gated by the individual stator phase sync signal for the respective stator phase, and to provide an out put signal for gating the associated pulsewidth counter; and each said pulsewidth counter being adapted to receive the pulsewidth angle signal as an input signal and to generate the respective train of current pulses for the respective stator phase.

39. The digital angle control of claim 37 wherein said PLL means comprises:
 clock means for generating a clock signal;
 first counter means for receiving said multiphase sync pulsetrain and said clock signals and generating a first digital word;

frequency multiplying means for generating a second digital word as a frequency multiple of said first digital word; and PLL counter means for receiving said second digital word and said clock signal and generating the resolution signal.

40. The digital angle control of claim 39 wherein said frequency multiplier means comprises programmable means for varying the frequency multiple of the resolution signal and interpulse interval of the resolution signal.

41. The digital angle control of claim 39 wherein the clock means comprises programmable means for varying the clock signal frequency with actual speed.

42. The digital angle control of claim 39 further comprising speed computation means responsive to said first counter means for generating an actual speed signal from said first digital word.

43. The digital angle control of claim 37 wherein said signal processing means comprises: a monostable multivibrator associated with each one of the respective stator phases for receiving a rotor position information signal associated with said each one of the respective stator phases and providing as its output the individual stator phase sync signal for said each one of the respective stator phases; and OR gate means coupled to the outputs of the monostable multivibrators for providing as an output signal the multiphase sync pulsetrain.

44. The digital angle control of claim 43 wherein said signal processing means further comprises means responsive to the rotor position information signals for determining the direction of motor rotation.

45. The digital angle control of claim 38 wherein said PLL means comprises:

clock means for generating a clock signal;

first counter means for receiving said multiphase sync pulsetrain and said clock signals and generating a first digital word;

frequency multiplying means for generating a second digital word as a frequency multiple of said first digital word; and PLL counter means for receiving said second digital word and said clock signal and generating the resolution signal; and wherein said signal processing means comprises:

a monostable multivibrator associated with each of said stator phases, respectively, for receiving a rotor position information signal associated with said each of said stator phases, respectively, and providing as its output signal, respectively, the individual stator phase sync signal for said each of said stator phases, respectively; and OR gate means coupled to the outputs of the monostable multivibrators to provide the multiphase sync pulsetrain.

46. The digital angle control of claim 45 wherein said signal processing means further comprises means responsive to the rotor position information signals for determining direction of motor rotation.

47. The digital angle control of claim 37 wherein each of said delay counters and said pulsewidth counters comprises an independently programmable counter, respectively.

48. A method of synchronizing phase current pulses applied to multiple stator phases of a switched reluctance motor, with rotor position, comprising the steps of:

generating rotor position information signals representative of instantaneous rotor position with respect to each stator phase;

processing the rotor position information signals to generate a multiphase sync pulsetrain and to generate individual stator phase sync signals for the respective stator phases;

generating a resolution signal from said multi-phase sync pulsetrain, the resolution signal being a phase-locked, frequency-multiplied derivative of said multiphase sync pulsetrain; and employing said resolution signal and the individual stator phase sync signals to convert a turn-on angle signal and a pulsewidth angle signal into corresponding current pulses synchronized with rotor position for each of said respective stator phases.

* * * * *